United States Patent [19]

Rohde

[11] Patent Number: 5,060,416
[45] Date of Patent: Oct. 29, 1991

[54] CORRUGATED TREE PROTECTOR AND TREE PROTECTION METHOD

[75] Inventor: George A. Rohde, Cottage Grove, Minn.

[73] Assignee: Seaberry Landscape, Inc., Eagan, Minn.

[21] Appl. No.: 567,152

[22] Filed: Aug. 14, 1990

Related U.S. Application Data

[63] Continuation-in-part of Ser. No. 293,213, Jan. 4, 1989.

[51] Int. Cl.⁵ ............................................. A01G 13/10
[52] U.S. Cl. .......................................... 47/23; 47/24; 138/162
[58] Field of Search ......................... 47/23, 24; 52/728; 405/216, 212; 138/151, 162

[56] References Cited

U.S. PATENT DOCUMENTS

| | | | |
|---|---|---|---|
| 185,044 | 12/1876 | Peace et al. | |
| 502,599 | 8/1893 | Gilman | |
| 561,391 | 6/1896 | Greene | |
| 682,031 | 9/1901 | Chisolm | |
| 1,116,961 | 11/1914 | Weixler | |
| 1,674,118 | 4/1927 | Merrick | |
| 1,879,813 | 9/1932 | Molitor | |
| 2,028,060 | 9/1935 | Gilbert | |
| 2,143,043 | 1/1939 | Wexler | 47/24 |
| 2,170,822 | 8/1939 | Kirkpatrick | 47/84 |
| 2,756,032 | 7/1956 | Dowell | 138/151 |
| 2,756,172 | 7/1956 | Kidd | 138/151 |
| 2,825,673 | 3/1958 | Tschappa | 138/151 |
| 3,291,437 | 12/1966 | Bowden | 52/728 |
| 3,333,361 | 8/1967 | Manak | 47/23 |
| 3,571,972 | 3/1971 | Carter, Jr. | |
| 4,023,374 | 5/1977 | Colbert | 138/162 |
| 4,244,156 | 1/1981 | Watts, Jr. | |
| 4,642,938 | 2/1987 | Georges et al. | |
| 4,700,507 | 10/1987 | Allen | 47/23 |
| 4,845,889 | 7/1989 | Taylor | 47/23 |

FOREIGN PATENT DOCUMENTS

| | | | |
|---|---|---|---|
| 3715623 | 10/1987 | Fed. Rep. of Germany | 47/23 |
| 2378441 | 9/1978 | France | 47/23 |
| 65697 | 11/1969 | German Democratic Rep. | 47/23 |

OTHER PUBLICATIONS

Air-Flow Tree Protectors from "Progressive Farmer", Feb. 1965, p. 52.

Primary Examiner—Henry E. Raduazo
Attorney, Agent, or Firm—Merchant, Gould, Smith, Edell, Welter & Schmidt

[57] ABSTRACT

A semi-rigid tree protector positionable about a circumference of a base of a tree, the base of the tree having a circumferential outer surface. The tree protector comprises a corrugated band mechanism for encircling the circumference of the base of the tree. The corrugated band mechanism includes a series of alternating ridges and grooves extending substantially vertically of the base of the tree when the band mechanism is positioned therearound. The band mechanism being made of materials which are sufficiently flexible and resilient to permit the band mechanism to be bent around the tree. Preferably, the grooves are reciprocated by vertically extending surfaces. Preferably, the band mechanism includes first and second ends, and a coupling mechanism for coupling the first and second ends together around the base of the tree. Methods of protecting the base of a tree from the impact of lawn care equipment and from plant eating pests and animals are also provided.

29 Claims, 4 Drawing Sheets

U.S. Patent  Oct. 29, 1991  Sheet 1 of 4  5,060,416
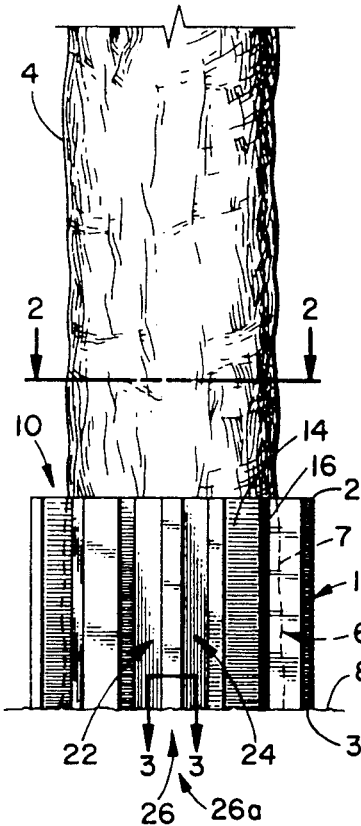
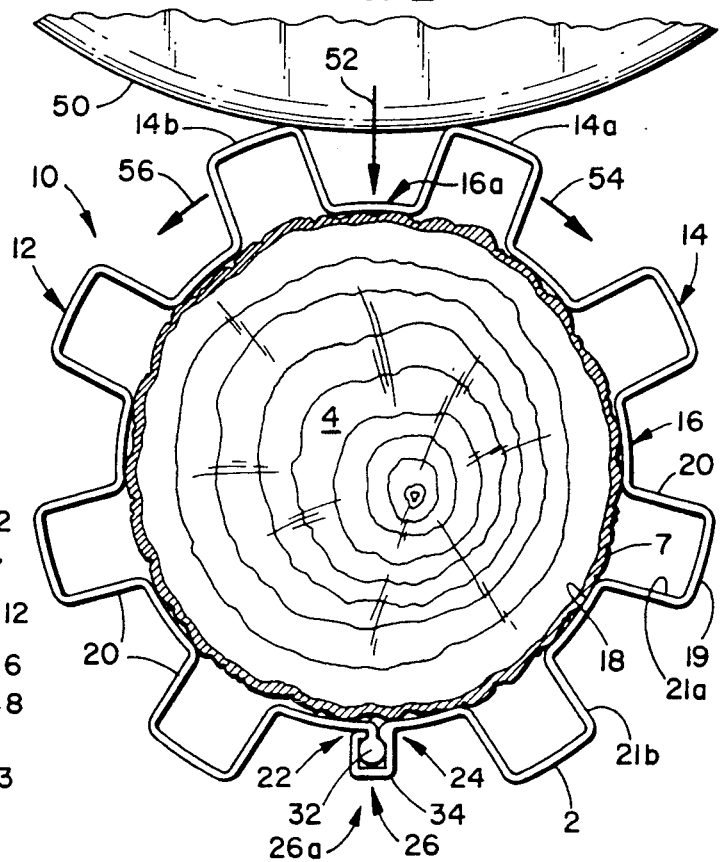
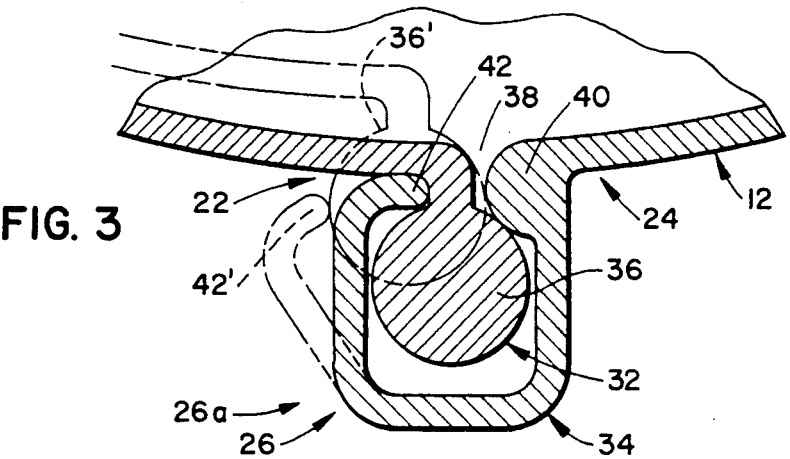
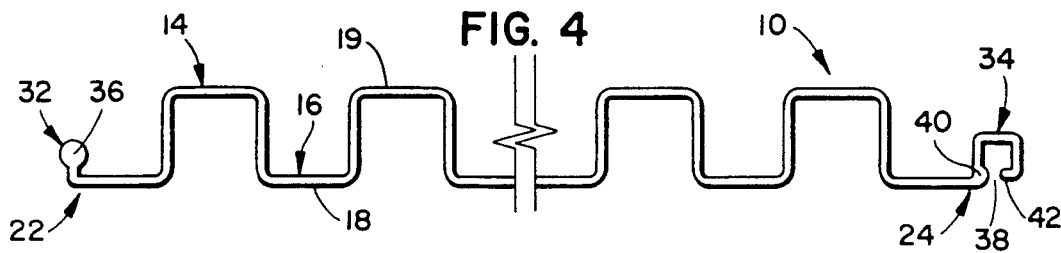

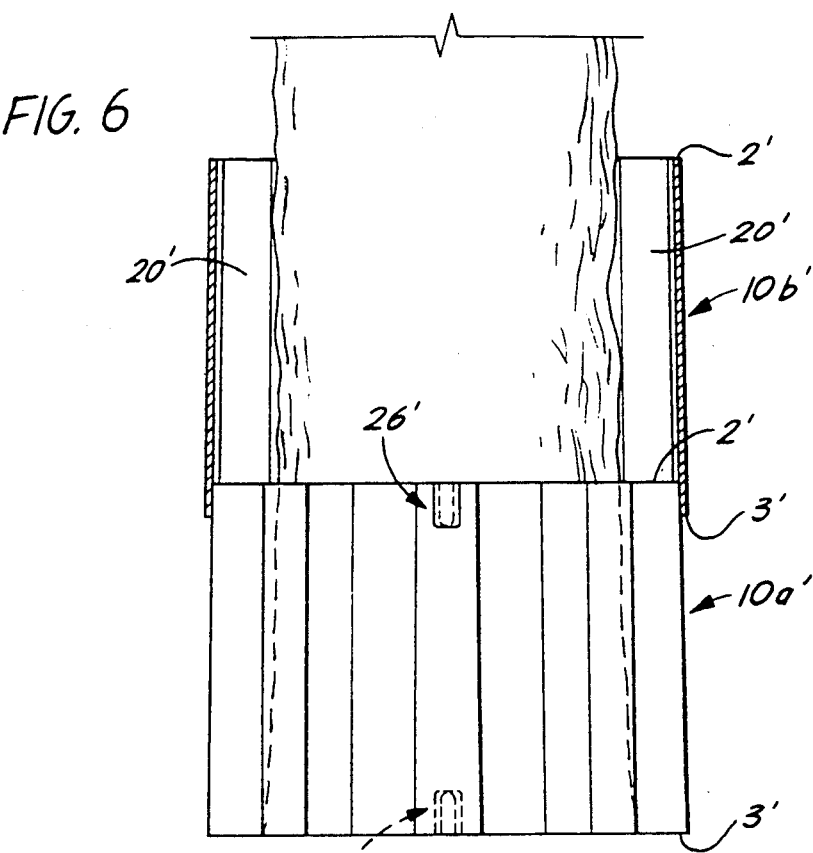
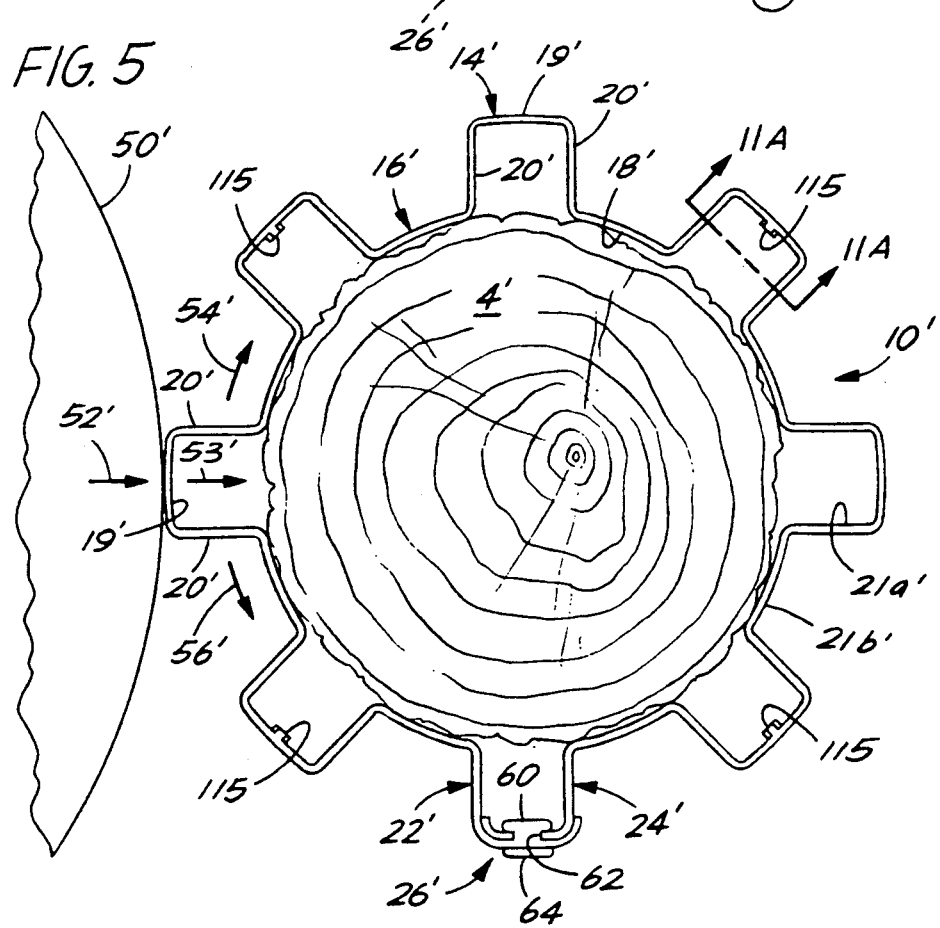

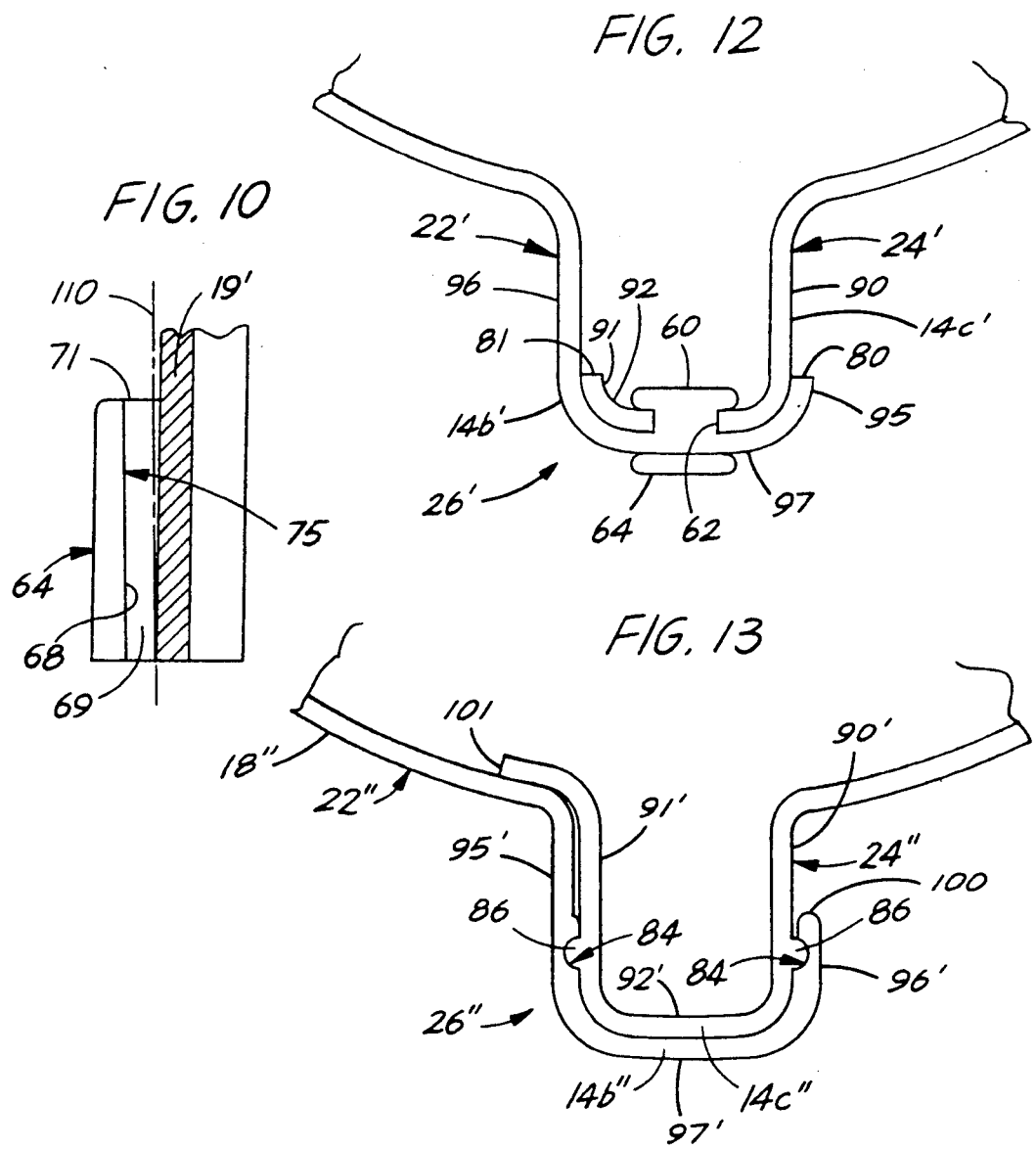
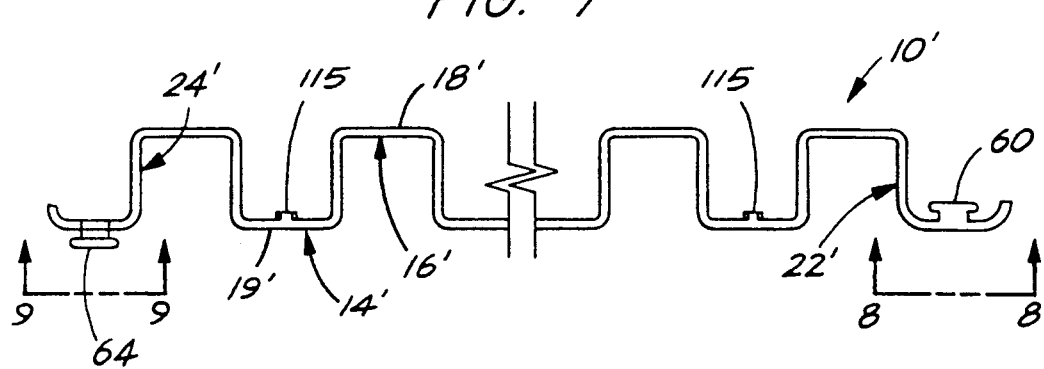

CORRUGATED TREE PROTECTOR AND TREE PROTECTION METHOD

CROSS-REFERENCE TO RELATED APPLICATION

The present application is a continuation-in-part application of U.S. Ser. No. 07/293,213, filed Jan. 4, 1989.

FIELD OF THE INVENTION

The present invention relates to tree protectors which are wrapped around a base or a trunk of a tree to protect the trunk from the impact of lawn care equipment such as lawn mowers, string trimmers, and the like.

BACKGROUND OF THE INVENTION

All horticultural plantings are sensitive to environmental factors of one kind or another. While trees do not generally appear to be as delicate as some other plantings, the care they receive in the years after they are transplanted from a nursery often plays a major role in determining how long the tree may live and whether it will develop into a strong and healthy tree with good prospects for enhanced longevity.

Unfortunately, trees often receive very rough treatment from caretakers and neighborhood lawnkeepers. This rough treatment can be especially damaging to a young tree which has a rather soft and undeveloped bark layer protecting the base of the tree where lawn mowers, string cutters and the like impact against these trees.

The impact of such lawn care equipment upon immature and mature trees can be extremely damaging. It can be particularly damaging to a young tree. When a blow is sustained at the base of a tree, the tissues which lie beneath the bark can be irreversibly damaged. The damage from one such impact may not kill the tree, however, it can damage the tree in such way as to decrease the ultimate health of the tree and diminish its longevity. Of particular concern is permanent damage to the vascular system in the cambium layer which is very close to the outer surface of the tree and is protected only by a thin layer of bark in immature trees. Because trees can be relatively expensive plantings, and especially because the development of a strong and healthy tree requires many years of growth during which a determination as to the general health and projected longevity of a tree is not easily made, injuries to young trees can be very troublesome.

The poor treatment which immature trees often receive can result in scar tissue from concussive impacts about the trunk of the tree over a period of many years. Such continual poor treatment often results in the premature death of the tree after a number of years of growth. It will be appreciated that it is not a simple thing to replace a tree which has grown in a particular place as many as 5 to 10 years, and that replacement of such a tree generally means beginning the process over again by transplanting another young tree, perhaps even a sapling, which like its predecessor, may never reach its intended maturity because of the failure to provide protection from lawn care equipment at the base of the tree.

This problem has been recognized in the nursery and landscape industries for years. In order to protect young trees, a wide variety of tree protectors have been used. Peace (U.S. Pat. No. 185,044) discloses a tree protector consisting of slats of wood bound together by metal bands which extend around a tree trunk. However, the materials require considerable assembly and appear to be rather inflexible. As the tree grows, the trunk can be restricted within the space provided by the tree protector, and may cause damage to the very trunk which it had previously protected. Furthermore, if an impact striking the tree protector is great enough, the tree protector itself can be forced against the tree to cause the damage it is intended to prevent.

Gilman (U.S. Pat. No. 502,559) discloses a tree protector roughly similar to that of Peace '044, providing a series of wooden slats which are bound together for wrapping around a tree.

Greene (U.S. Pat. No. 561,391) discloses a tree protector made of heavy gauge sheet metal which is extremely inflexible and would have to be removed as the tree grew older or it would irreversibly damage the trunk of the tree as it outgrew the space provided for its growth within the device. Furthermore, this device can also damage the tree if it is permitted to impact against the tree in response to forces which impact against it.

Chisolm (U.S. Pat. No. 682,031) provides yet another tree protector providing wooden slats which are bound together in a manner similar to that of the tree protectors of Peace and Gilman.

Weixler (U.S. Pat. No. 116,961) discloses a tree protector consisting of a series of flexible hoops interconnected by a plurality of resilient palings longitudinally grooved to provide biting edges. The tree protector of Weixler has a rather complicated design requiring considerable labor for assembly and also has sharp edges which will be damaging to string trimmers which are used in near proximity thereto and to the tree should the device come in contact therewith.

Georges et al. (U.S. Pat. No. 4,642,938) discloses a rigid plant protection device designed to encircle a tree. The disclosed device is a one-piece housing structure including a series of vertically extending, generally rectangular shaped ridges formed into the side wall of the housing to provide rigidity and sturdiness of construction. Unfortunately, this device consumes too much space and is inflexible so that it can impact against the tree in response to forces which impact against the device.

Other devices have also been used by those of skill in the art. The inventor has previously used ribbed drainage pipe or conduit to encircle a small tree. In order to use the ribbed conduit, a cut must be made in it which is roughly parallel to the axis thereof so that the conduit may be opened to receive the tree. Unfortunately, even when this flexible plastic conduit is used to protect the base of a small tree, a mower or a string trimmer can damage the trunk of the tree by impacting against the ribbed conduit in one of the horizontal grooves between the alternating ribs of the conduit. These ribs are oriented horizontally when encircling a base of a tree so that a flared edge of a mower housing, or a heavy duty metal string spinning around a string trimmer, can drive the groove against the tree and all the impact to be transferred directly to the tree.

Accordingly, it is clear that there has existed a long and unfulfilled need in the prior art for a tree protector which is inexpensive to manufacture and easy to assemble, is not as likely to impact adversely against the tree itself, is not restrictive so as to choke off growth once the tree has outgrown the device when the device is not removed, and provides adequate protection to protect the vascular system in the cambium beneath the bark layer. The present invention provides solutions to these and other problems and also offers other advantages over the prior art, and solves other problems associated therewith.

SUMMARY OF THE INVENTION

Accordingly, it is an object of the present invention to provide a cost effective, resilient tree protector which will protect the base of a tree when wrapped around the circumferential outer surface thereof. In order to achieve this object, the present inventor has developed a semi-rigid corrugated tree protector which is flexible and resilient. The present tree protector is designed to provide a cushion for impacts transmitted by lawn care equipment, thereby minimizing damage to a base of a tree which might diminish the ultimate longevity thereof.

In accordance with the present invention, a semi-rigid tree protector positionable about a circumference of a base of a tree is provided. The tree protector comprises corrugated band means for encircling the circumference of the base of the tree. The band means include a series of alternating ridges and grooves extending vertically of the base of the tree when the band means are positioned around the base of the tree. The grooves are preferably reciprocated by vertically extending surfaces each of which preferably have a roughly similar radius of curvature to that of a circumferential outer surface of a base of a roughly circular tree when the band means are positioned therearound. Preferably, the corrugated band means include first and second ends, and coupling means for coupling the first and second ends together around the tree. In a first embodiment, the coupling means preferably include a coupling member connected to the first end, and a channel member connected to the second end and adapted to receive and retain the coupling member. In a second embodiment, the coupling means preferably include first and second reciprocating ridges connected to the first and second ends respectively. The first reciprocating ridge attached to the first end includes a pair of vertical channels for individually receiving one or the other of a pair of vertical ribs located on opposite vertical faces of the second reciprocating ridge. In a preferred embodiment, the coupling means include overlapping ridge portions including upper and lower knob members which can be engaged respectively in upper and lower slots in the respective ridge portions thereby coupling the ends of the tree protector together.

The present invention also provides methods of protecting a base of a tree from the impact of lawn care equipment. One such method comprises the steps of providing a tree protector positionable about a circumference of the base of the tree, wherein the tree protector comprises corrugated band means for encircling the circumference of the base of the tree. The corrugated band means include a series of alternating ridges and grooves extending substantially vertically of the base of the tree when the band means are positioned therearound. The method further comprises the step of encircling the circumference of the base of the tree with the corrugated band mean, wherein the base of the tree may be protected from impacts of lawn care equipment used in near proximity thereto. Preferably, the step of encircling the tree with the band means further includes coupling the band means with coupling means attached to first and second ends of the band means.

The tree protector of the present invention is designed to cushion impacts of lawn care equipment which might otherwise damage the base of the tree. The present tree protector design is particularly effective in protecting young trees from the impact of an edge of a housing of a power mower, particularly those having a flared edge for added strength. When grass around a tree is mowed, operators are often quite careless. Because the operators generally want to cut as close to the tree as possible to eliminate any need for trimming that which may remain after they have mowed around a tree, operators attempt to bring the edge of the mower housing as close to the tree as possible. Their major concern is the efficient use of their time in its narrowest sense, and the health and ultimate longevity of the tree is generally a secondary consideration especially if the operator is not the owner of the tree and does not have a long term interest in the health of the tree.

Once the present tree protector is in place, it is extremely useful for protecting the tree. The mower operator may take the mower housing right up against the tree protector without being concerned about damaging the base of the tree. Preferably, the grooves are U-shaped in transverse cross-section and include reciprocating surfaces which are vertically extending and have a roughly similar radius of curvature to that of a tree having a roughly circular circumference. When the housing of a mower or other equipment impacts against the present tree protector, the ridges cushion the impact by separating or spreading out in a resilient fashion and by transferring a portion of the force of the impact to the tree via the vertically extended surfaces adjacent to the outer surface of the tree. Each of these surfaces generally spreads the force of an impact upon the tree protector out over its entire surface thereby dimishing the impact upon any specific point or area on the surface of the tree. The corrugated design of the present tree protector also provides for other dynamic responses to impacts transmitted to its ridges. These responses aid in the cushioning and harmless transfer of forces, but are not fully understood so as to permit an adequate description thereof.

The preferred embodiment of the present invention also includes a plurality of upright columns and is slightly tapered so that the upper portion of one preferred tree protector is easily received within the lower portion of a second tree protector when the respective ends of the tree protectors are coupled together. The upright columns extend inwardly away from the inner surface of a coupled tree protector and are slightly recessed away from the lower edge the tree protector. This allows one coupled tree protector to be stacked on top of another coupled tree protector wherein the upper edge of the lower of the two tree protectors is received within a lower portion of the tree protector stacked upon it because of the narrowing or truncation of the upper portion of the tree protector which enables it to slip into the lower portion of the tree protector stacked upon it when the respective ridges and grooves are in reciprocal positions. When the upper edge of the lower tree protector is received within the lower portion of the tree protector stacked upon it, the upright columns will come to rest upon this upper edge, thereby allowing the tree protector stacked thereupon to rest on the upper edge of the lower of the two tree protectors. It will be appreciated, that a series of single tree protectors may be coupled and stacked one on top of another so as to protect trees, shrubbery and other plant life from plant-eating pests and animals. Additionally, the tree protectors can be stacked sufficiently high to deter squirrels and other unwanted creatures from climbing the trunk of the tree. In a preferred embodiment, the protector is of a relatively smooth, non-porous material that is relatively difficult for squirrels to grasp or dig into with their paws.

It will also be appreciated that the present tree protector is relatively inexpensive to make. The plastic materials used to make the present tree protector, preferably polyethylene or polyvinyl chloride, are relatively low cost materials. It will be appreciated, however, that any polymeric material, which provides the characteristics necessary to provide the tree protector of the present invention, may be used. In addition, the present tree protector is preferably an integral piece of plastic which is preferably extruded or molded. Therefore, virtually no labor is required for assembly, and production costs can be minimized through automation if large scale production is warranted.

It will also be appreciated that preferred embodiments of the present invention provide a flexible tree protector which allows the base of the tree to grow without suffering from severe restrictions with respect to the space allowed for the tree to grow. If a tree trunk grows bigger than the space provided by the interior diameter of the present tree protector, the grooves will simply widen as the ridges flatten out and the tree protector is stretched around the tree. If the tree continues to grow, it is believed that the force of the expansion will simply pull the coupling mechanism of the first embodiment apart, thereby freeing the tree entirely of the restrictions placed upon tree growth by the tree protector. In this way, the tree may outgrow the space provided by the tree protector, but the tree will not be injured if the tree protector is forgotten and not removed by the tree's owner or caretaker. The coupling mechanism of the present tree protector is configured so as to allow a plurality of tree protectors to be coupled together in series so that the coupled series of the tree protectors can be coupled together around a large tree or shrub which cannot be encircled by a single tree protector because of the size of the circumference of the tree. It will also be appreciated that the columns on the inside of such a series of tree protectors coupled around a tree, will support it when stacked upon a second coupled series of tree protectors in a similar manner as described above for single tree protectors so long as the two coupled series of tree protectors include the same number of tree protectors in series.

In the present specification "psi" will be understood to mean pounds per square inch. Also, "protecting a tree" will be understood to mean protecting a tree from the impact of lawn care equipment which can damage the tissue of the tree, particularly vascular tissue in the cambium layer of the tree.

Further features provide additional advantages. For example, the preferred coupling mechanism provides a semi-rigid channel member for receiving the coupling member. The elements of this mechanism preferably provides sufficient rigidity to hold the ends of the corrugated tree protector together for long periods of time in spite of changes in climatic conditions and the impact of various types of lawn care equipment upon the tree protector. At the same time, this mechanism is flexible enough and resilient enough to receive and release the coupling member when appropriate forces are directed by an individual coupling or uncoupling the inventive device. Another coupling mechanism embodiment includes a flanged knob extending in a radial direction from the surface of one end of the tree protector. The second mating end of the tree protector includes a recess or notch which receives the knob member such that the second end of the protector slides between the flange of the knob and the surface of the first end of the protector. Preferably, the knob member and notch are located neat an upper or lower edge.

This coupling mechanism may additionally include a second similar coupling member at the opposite edge. Where two coupling arrangements are included, a flanged knobbed extends radially inward from the inner surface one end at one edge of the protector, and a second flanged knob extends radially outward from the outer surface of the second end at the opposite edge. The first end includes a recess, slot or aperture constructed and arranged to mate with the second flanged knob in the same manner as the first knob and recess mate. Thus, to effect coupling, one displaces the ends of the tree protector in the axial direction sufficiently for the heads or leading edges of the flanged knobs to be aligned with, but linearly axially somewhat displaced from, the mating slot or recess. The user then slides the ends with respect to each other in an axial direction so that the knobs slide into their respective slots, with the notched ends being wedged between the flanges of the knobs and the surface of the knobbed end. Preferably, the knobs are equal in length in the axial direction to the length of the recesses, such that when the knobs are fully inserted in the notch, with the leading edges of the knobs to abutting the edges of the recesses, the tree protector ends are properly aligned.

The coupling arrangement is preferably positioned within a groove of the tree protector so that the irregularities of the surface of the protector do not contact the tree surface. That is, preferably the only surfaces of the tree protector that contact the tree are smooth, continuous surfaces. Furthermore, it will be appreciated that the tree protector of the present invention will protect the trunk of a tree, but will not provide sharp edges which will damage the string or plastic or metal strands of string trimmers so as to require more frequent replacement thereof.

These and various other advantages and features of novelty which characterize the present invention are pointed out with particularity in the claims annexed hereto and forming a part hereof. However, for a better understanding of the present invention, its advantages, and other objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which like and primed (', ", and "') reference numerals indicate corresponding parts of the preferred embodiments of the present invention throughout the several views, FIG. 1 is a side view of a first embodiment of a tree protector of the present invention when positioned around the circumferential outer surface of a base of a tree;

FIG. 2 is an enlarged plan view of the first embodiment of the tree protector of the present invention as seen from the Line 2—2 of FIG. 1;

FIG. 3 is an enlarged cross-sectional view of the coupling mechanism of the first embodiment of the tree protector as shown from the Line 3—3 in FIG. 1 and showing the coupling member 32 being inserted or removed from the channel member 34 in phantom;

FIG. 4 is an elevated view of the top of the first embodiment of the tree protector when it is not in use for its intended purpose;

FIG. 5 is an enlarged plan view of a second embodiment of the tree protector of the present invention similar to the view shown in FIG. 2 for the first embodiment thereof;

FIG. 6 is a side view showing a cross-section of the second embodiment of the tree protector of the present invention shown in FIG. 5 stacked upon another preferred tree protector like the one shown in FIG. 5; and FIG. 7 is an elevated view similar to the view shown in FIG. 4 of the top of the preferred tree protector shown in FIG. 5;

FIG. 10 is a sectional view of a portion of the second end of the preferred tree protector as shown from the Line 10—10 of FIG. 9;

FIG. 12 is an enlarged elevated view of the top of the respective en the preferred tree protector when coupled in FIG. 5; and FIG. 13 is an enlarged elevated view of the top of the first and second ends of a third embodiment of the present invention similar to the preferred embodiment but having yet another coupling mechanism.

DETAILED DESCRIPTION OF THE PREFERRED EMBODIMENT

Figure 8:
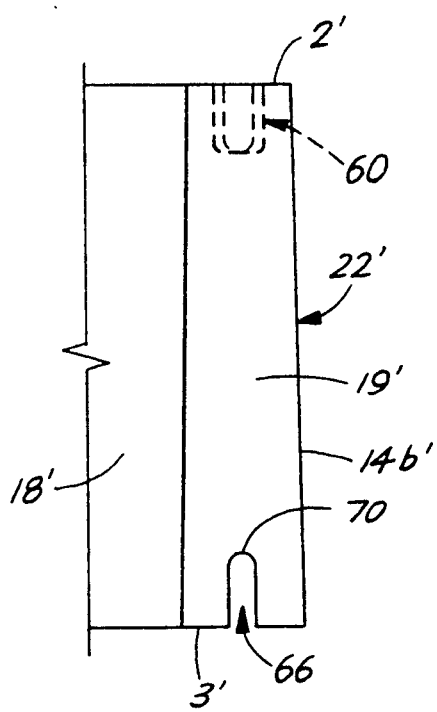
FIG. 8 is a side view of the first end of the preferred tree protector of the present invention as seen from the Line 8—8 of FIG. 7.

Referring now to the drawings, and to FIGS. 1 and 2 in particular, the present invention provides a semi-rigid tree protector 10 which is positionable about a circumference of a base of tree 4. The tree protector 10 comprises a corrugated band 12 including a series of alternating ridges 14 and grooves 16 extending substantially vertically of the base of the tree 4 when the band 12 is positioned around the base of the tree 4 and extending the entire width of the tree protector 10. That is, the protector 10 has top and bottom edges 2 and 3, respectively, between which the ridges and grooves extend. It will be appreciated that the base or the trunk 6 of the tree 4 is that portion of the tree which is immediately above the ground 8 in which the tree 4 grows.

The grooves 16 of the band 12 of the present tree protector 10 preferably include walls 18 which extend vertically when the band 12 is positioned around the base 6 of the tree 4. Walls 18 generally define or lie on a cylinder which, in use, circumscribes the tree. Each U-shaped ridge 14 includes a vertically-extending wall 19. Walls 19 lie generally on a cylinder that is coaxial with and larger in diameter than the cylinder defined by wall 18. Extending between and joining circumferentially adjacent surfaces 18 and 19 are radially-extending vertical walls 20. In this manner, alternating ridges 14 and grooves 16 form the band 12. The ridges 14 and the grooves 16 preferably alternate at substantially equivalent intervals.

The tree protector 10 has interior and exterior surfaces 21a and 21b, respectively. The interior surfaces 21a of walls 18 are able to contact the tree, while the interior surfaces 21a of ridge 14 (or of walls 19 and 20) are generally spaced from the tree and therefore will not typically contact the tree outer surface 7.

The vertical grooves 16 are designed so that the tree protector 10 will give, or elastically yield, on impact with ridges 14 and provide a cushion which partially absorbs and partially transmits the energy of the impact to broad surfaces so that the energy of the impact is not transmitted to the tree and thereby is not damaged. Vertical ridges 14 prevent equipment such as a mower from striking a surface, such as wall 18, which would directly strike the tree. Because ridges 14 project radially outward beyond surfaces 18, the resilient ridges 14 act somewhat like bumpers, preventing the mower from striking a surface, such as the interior surface of wall 18, that will touch the tree. That is, walls 18 are capable of contacting the tree; however, it will not be possible for blunt objects such as a mower housing to contact walls 18 because vertical ridges 14 extend outwardly and are advantageously spaced so that there is not sufficient room for a mower housing to penetrate between ridges 14. In this manner, ridges 14 absorb energy from the impact of being hit by a mower because of the enhanced area of the U-shaped ridge 14 and because of the resiliency of the ridges 14.

The mechanics of how the tree protector responds to a strike from a mower can be understood with reference to FIG. 2. In FIG. 2, a lawn mower housing 50 of a mower is shown impacting against two adjacent ridges 14 of the corrugated band 12. Reference arrow 52 in FIG. 2 shows the direction of the force of impact of the mower housing 50 against the tree protector 10, and references arrows 54 and 56 roughly show directions of consequential movements of the adjacent ridges 14a and 14b of the corrugated band 12 which help to cushion the impact of the mower housing 50. When the mower impacts on the adjacent ridges 14a and 14b, the groove 16a between the adjacent ridges 14a and 14b tends to widen at the top and the ridges tend to move further apart while they resist and cushion the impact and diffuse the force of the impact along the length of the corrugated band 12 and transmit it to the circumferential outer surface 7 of the base 6 of the tree 4 in the locations where the vertically oriented walls 18 come into contact with the circumferential outer surface 7 thereof.

FIG. 5 illustrates the mechanics of impact from a mower 50' or the like from a slightly different orientation. Mower 50' strikes tree protector 10', another embodiment described in detail below, in the direction indicated by arrow 52'; that is, the mower 50, contacts a single ridge 14' generally flush with wall 19'. Wall 19' elastically yields, or gives, somewhat on impact, moving generally in the direction indicated by arrow 53'. Walls 20' move outward in the directions indicated by arrows 54' and 56'. In this manner, the tree protector 10' absorbs energy from the impact of the mower 50'. It is to be understood that a tree protector according to the present invention will absorb energy from an impact from any direction in the manner described above with respect to FIGS. 2 and 5. Impact from directions 52 and 52' are offered merely as illustrations.

As can be understood with reference to FIG. 4, the band 12 preferably includes first and second ends 22 and 24 and a coupling mechanism 26 for coupling the first and second ends 22 and 24 together around the circumferential outer surface 7 of the tree 4. One embodiment 26a of coupling mechanism 26 is shown in FIGS. 1–4. The coupling mechanism 26a includes a coupling member 32 connected to the first end 22 and semi-rigid channel member 34 adapted to receive and retain the coupling member 32. The channel member 34 is connected to the second end 24 of the corrugated band 12. The coupling member 32 includes a column 36 which is connected to the first end 22 along the entire width of the tree protector 10 as if the column 36 were simply an enlargement of the first end 22 of the band 12. As shown in FIGS. 2 and 3, a horizontal cross-section of the column 36 is circular. The channel member 34, which is adapted to receive and retain the coupling member 32, has a resilient opening 38 defined by a thickening 40 proximate the location where the channel member 34 is connected to the second end 24, and by a lip 42 opposite the thickening 40. The opposing lip 42 and thickening 40 of the channel member 34 create an opening 38 which is small enough to retain the column 36 of the coupling member 32 once the coupling member 32 is inserted into the channel member 34. As shown in phantom in FIG. 3, the opening 38 is enlarged when the column 36' is inserted or removed, thereby displacing a portion of the channel member which includes the lip 42'.

The present tree protector 10 is made of a resilient plastic material, preferably a polyethylene or a polyvinyl chloride material, which is semi-rigid while providing some flexibility. The material is also sufficiently resilient that the opening 38 is a resilient opening through which the coupling member 32 can be forced in order to insert the column 36 within the channel member 34. The plastic material of the channel member 34 will subsequently return to its initial shape once the column 36 is inserted therein so that the channel member 34 can then retain the coupling member 32 until force is applied to withdraw the coupling member 32 from the channel member 34. Because of the semi-rigid structure of the channel member 34, it preferably requires considerable force to remove the coupling member 32 from the channel member 34. In doing so, a person must pull the column 36 out of the channel member 34 with enough force to enlarge the resilient opening 38 so that the column 36 can pass out of the channel member 34 through the opening 38. When the coupling member 32 is inserted in the channel member 34, the column 36 must also be forced through the opening 38 with enough force to enlarge the resilient opening 38 so that the column 36 can pass therethrough.

Referring now to FIGS. 5–12, another preferred embodiment of the present tree protector 10' is described. In FIG. 5, the preferred tree protector 10' is shown coupled around a trunk of a tree 4'. The preferred tree protector 10' differs from the first tree protector 10, shown in FIGS. 1-4, in that it has a different coupling mechanism 26'.

Figure 9:
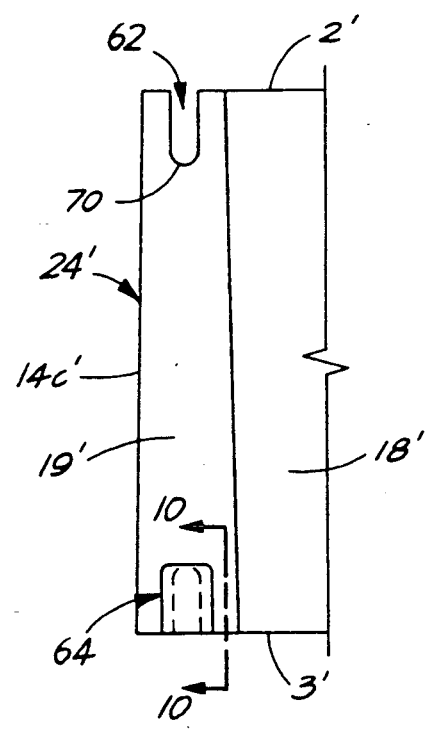
FIG. 9 is a side view of the second end of the preferred tree protector of the present invention as seen from the Line 9—9 of FIG. 7.

The coupling mechanism 26' of the preferred tree protector 10' includes the first and second ends 22' and 24' the preferred tree protector 10' which are shown in FIG. 8 and 9 respectively. The first end 22' includes a first knob member 60 which is designed to be received in a first slot 62 in the second end 24'. The slot 62 preferably extends axially from the top edge 2'. The knob member 60 is similarly located near the same edge 2' as the slot 62. (Alternatively, both the knob and the slot could be at the bottom edge 3'.) The slot 62 terminates at end 70. Further, the knob member 60 and the slot 62 are positioned on an outwardly extending ridges 14b, and 14c'. Thus, preferably, the first end 22' terminates within a ridge 14b'and second end 24' similarly terminates within a ridge 14c'. Ridge 14c''' is generally U-shaped and includes two generally parallel radially-extending leg portions 90 and 91 and a third, transverse leg portion 92 extending between leg portions 90 and 91. Similarly, ridge 14b''' is generally U-shaped and sized to receive ridge 14c''' therein in a nested fashion. Ridge 14b''' includes two generally parallel, radially-extending leg portions 95 and 96 with a third leg portion 97 extending between leg portions 95 and 96.

The tree protector 10' illustrated in FIG. 5–12 includes a second coupling mechanism 26' located at the opposite edge of the tree protector. The second end 24' includes a second knob member 64 which is designed to be received in a second slot 66 in a lower portion of the first end 22'. The respective knob members 62 and 64 are preferably integrally molded portions of the tree protector 10'. Each includes a flange or distal planar portion 68 interconnected with the other portions of the tree protector 10' by a proximal connecting portion 69 which resides in the respective slot 62 or 66 when the tree protector 10' is coupled around a tree 4' as shown in FIG. 5. The connecting portion 69 has a leading edge 71 which abuts the end 70 of its respective slot 62 or 66. The flange portion 68 of each of the respective knob members 64 and 60 has an inner surface 75 which faces the outer wall 19'. The distance separating the respective inner surface 75 and the outer wall 19' is also angled or sloped so as to permit the flange portion 68 of the knob member 60 or 64 to tighten down upon the portion of the tree protector 10' surrounding the respective slots 62 and 66 which engage the respective proximal connecting portions 69. As shown in FIG. 10, this distance between the distal planar portion and the outer wall 19' converges from top to bottom for the second knob member 64.

In order to couple the respective ends 22' and 24' of the preferred tree protector 10', the tree protector is manipulated so that the respective ends 22' and 24' face one another with the outer surface 21b' of end 24' in relatively close proximity to the inner surface 21a' of end 22'. The second end 24' is then depressed slightly from the circumferential plane of the tree protector 10' and the ends 22' and 24' are axially displaced with respect to one another such that leading edge 71 of the connecting portion 69 is axially aligned with and proximate the appropriate, mating slot 62 or 66 so as to engage the respective proximal connecting portion 69 in the respective slots 62 and 66 simultaneously. Ends 22' and 24' are then slided axially with respect to one another such that the connecting portion 69 slides into respective slots 62 and 66. The connecting portions 69 are then engaged in the respective slots 62 and 66 as the respective ends 22' and 24' are brought back into alignment with one another so as to couple the tree protector 10' together. In other words, ends 22' and 24' are slided in an axial direction with respect to one another such that a portion of end 22' slides between planar portions 68 and a portion of the outer surface 21b' of end 24' until the end 70 of slot 62 abuts the leading edge 71 of knob member 60. Knob member 64 similarly slides into slot 66.

As can be understood with reference to FIG. 12, end 22' has a terminal edge 80 and end 24' has a terminal edge 81. Preferably terminal edge 81 of end 24' terminates within the U-shaped ridge 14c' so that the edge 81 will not contact the tree.

Referring now to FIG. 13, yet another coupling mechanism 26" is shown. The first end of this alternate embodiment includes a pair of channels 84 which extend vertically along the inside of a ridge 14b" which engages a pair of protrusions 86 on the outer surface of a ridge 14c" of the second end 24". The alternate coupling mechanism 26" is made of integrally molded polymeric materials which are semi-rigid and allow the first end 22" to snap onto the second end 24". More specifically, ridge 14b" overlaps and mates with ridge 14c", and protrusions 86 snap into channels 84. In the embodiment shown in FIG. 13, the protrusions 86 are located on end 24" and the recesses 84 located on end 22". It is to be understood that alternatively the protrusions could be located on end 22" and the recesses could be located on end 24". Ridge 14c" is generally U-shaped and includes two generally parallel radially-extending leg portions 90' and 91' and a third, transverse leg portion 92' extending between leg portions 90' and 91'. Similarly, ridge 14b" is generally U-shaped and sized to receive ridge 14c" therein in a nested fashion. Ridge 14b" includes two generally parallel, radially-extending leg portions 95' and 96' with a third leg portion 97' extending between leg portions 95' and 96'. Preferably, the inside surface of leg portions 95' and 96' define recesses 84. Protrusions 86 extend from the outside surface of leg portions 90' and 91'.

End 22" has a terminal edge 100 and end 24" has a terminal edge 101. Leg 91' is shown as extending inwardly beyond the length of leg 95' such that terminal edge 101 lies to the inside of wall 18". Alternatively, it is contemplated that leg 91 be shorter than leg 95 such that terminal edge 101 lies along or adjacent leg 95 so that no relatively sharp edges are proximate or touching the tree. In the preferred embodiment, the resiliency of the band 12" allows the band 12" to be opened sufficiently for end 22" to be lifted over end 24". In order to couple the respective ends 22" and 24" together, one spreads the band 12" open sufficiently far to allow end 22" to overlap end 24". Then, one would squeeze ends 22" and 24" together until protrusions 86 snap into channels 84.

Regardless of which embodiment of the connecting mechanism is included, the tree protector of the present invention may be slightly tapered or have a truncated conical shape. That is, the outer diameter of the tree protector at one end, preferably the top or upper end, is smaller than the outer diameter of its bottom or lower end. This arrangement is illustrated, for instance in FIG. 6. As a result, it is possible to stack the tree protectors to protect a greater height of the tree trunk. The larger bottom portion of one tree protector 10b' can be slipped over the smaller top portion of a second tree portion 10a, as shown in FIG. 6. The number of tree protectors 10' which may be stacked in this manner would be limited only by practical considerations.

As shown in FIG. 10, the outer wall 11' of the tree protector 10' angles just slightly away from a perfectly vertical line 110 so that the circumferential dimensions of the preferred tree protector 10' are tapered as they extend from the lower portion of the tree protector 10' to the upper portion thereof. That is, the protector has a somewhat smaller circumference at one end than at the opposite end. Preferably, the outer wall 11' is angled or sloped about 0.1°–4.0°, more preferably about 0.5°–2.0°, and even more preferably about 1.0° from a vertical plane or the vertical line 110 shown in FIG. 10.

Figure 11A:
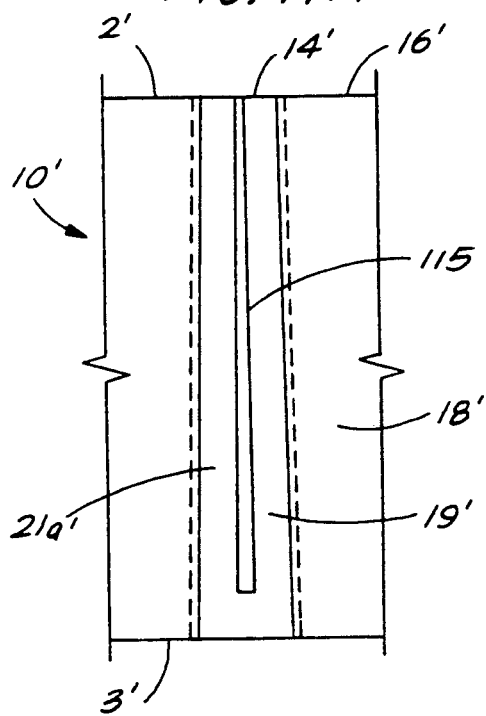
FIG. 11A is a side view of the inside surface of the preferred tree protector of the present invention as shown from the Line 11A—11A of FIG. 7.
Figure 11B:
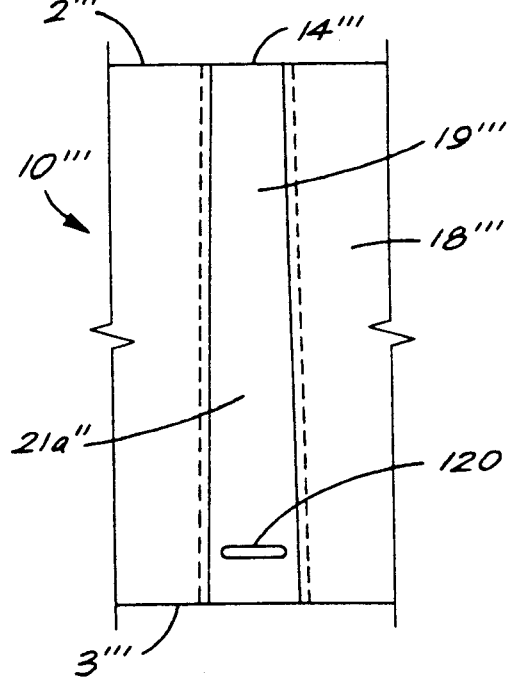
FIG. 11B is a side view similar to FIG. 11A showing an alternate embodiment having horizontal protrusions instead of the upright columns.

Because of the slight flare of the circumferential dimensions of the tree protector 10', the upper portion of the tree protector 10a' can be received within the lower portion of the tree protector 10b' as shown in FIG. 6. In this manner, when the tree protector 10' is coupled, one tree protector 10b' can be stacked upon another tree protector 10a' as shown in FIG. 6. As illustrated for instance in FIG. 11A, the preferred tree protector 10' includes a number of upright columns 115 on the interior surface 21a' of ridges 14' which are recessed slightly away from the bottom edge 3'. Preferably, the recess is about 0.1–3.0 inches, more preferably about 0.25–2.0 inches, while in a preferred embodiment now in production it is 0.38 inches. Because the columns 115 are recessed away from the bottom edge 3' the tree protector 10b' can be stacked on another tree protector 10a' such that the columns 115 sit upon the upper edge 2' of the ridges 14' such that the lower of the tree protectors 10a' supports the tree protector 10b' stacked upon it. It will be appreciated that a series of tree protectors 10' may be stacked one on top of another in series. Alternatively, a plurality of protrusions 120 which extend outwardly from the inner surfaces 21a' of alternating ridges 14''' of an alternate embodiment 10'''(see FIG. 11B) can be provided in lieu of the columns 115 as shown in FIG. 11A. Protrusions 120 in ridges 14' extend generally horizontally and are recessed away from the bottom edge 3' and rest atop the top edge 2' of a lower protector 14a'''

While it is preferable for stacking that the tree protectors 10a' and 10b' be constructed with tapering outer diameters, stacking is also contemplated for a tree protector that has an outer diameters uniform along its length. For instance, if the tree protector is sufficiently resilient, it is possible to squeeze an end of one tree protector radially inward about its circumference such that it can be received within an end of another tree protector.

The tree protector 10 of the present invention is preferably made by a process of local extrusion or injection molding. In preferred embodiments, the grade of the materials used to make embodiments of the present invention, preferably polyethylene or polyvinyl chloride, will be sufficient to withstand the impact of at least about 20 pounds at three miles per hour, preferably about 30 pounds, and most preferably about 40 pounds at three miles per hour. Based upon calculations using the formula $F = \frac{1}{2}mv^2$ where "F" represents force, "m" represents mass, and "v" represents velocity, it is believed that the impact the preferred embodiments would be able to withstand would be at least about 6 psi, preferably about 8 psi, more preferably about 10 psi, and most preferably about 12 psi. Preferred embodiments of the tree protector 10 are made of polymeric materials or a combination of polymeric materials which are effective to allow the tree protector 10 to be somewhat flexible and yet resistant to forces which would otherwise damage the tree.

In preferred embodiments, UV stabilizers are used to prevent discoloration of the tree protector. Although it will be appreciated that the tree protector may be any color, the colors black, tan, and various shades of green are preferred.

The tree protector of the present invention may be made in many sizes having virtually any width or inside diameter when its ends are coupled together in order to accommodate a broad range of trees, from saplings to mature trees. However, certain sizes are especially preferred. The width of the tree protector, or its height when it rests on the ground, will preferably be about 3-15 inches, more preferably about 4-10 inches, while the inside diameter of the device, which is the distance between opposite vertically extending walls 18, will preferably be about 3-15 inches, more preferably about 4-10 inches. Preferred embodiments of the present tree protector have widths of 4 or 6 inches and inside diameters of 4 or 6 inches.

The present invention also provides methods of protecting a base 6 of a tree 4 from the impact of lawn care equipment. The preferred method comprises the steps of providing a tree protector 10 of the present invention and encircling the circumference of the base 6 of a tree 4 with the tree protector 10. The step of encircling the circumference of the base 6 of the tree 4 with the tree protector 10 preferably includes roughly orienting the vertically extending walls 18 of the band 12 with the circumferential outer surface 7 of the base 6 of the tree 4. More preferably, the step of encircling the circumference 7 of the base 6 of the tree 4 includes coupling the first and second ends 22 and 24 of the band 12 together. It will be appreciated that coupling the first and second ends 22 and 24 together will preferably include inserting the coupling 32 into the channel member 34. Preferably, inserting the coupling member 32 into the channel member 34 includes forcing the column 36 into the channel member 34 via the resilient opening 38 and momentarily enlarging the resilient opening 38 to permit the passage of the column 36 there through in the process thereof. The present method also preferably includes bending each of the vertically extending walls 18 to roughly the same radius of curvature of the circumferential outer surface 7 of the base 6 of the tree 4 in the step of encircling the circumference of the tree. Alternatively, a method of protecting a base 6 of a tree 4 is provided comprising the steps of providing a tree protector 10 of the present invention and wrapping the circumference of the base 6 of the tree 4 with the tree protector 10 so that the base 6 of the tree 4 is protected from the impact of lawn care equipment used therearound. Preferably, the step of wrapping the tree protector 10 around the base 6 of the tree 4 is followed by the step of coupling the tree protector 10 by coupling the coupling mechanism 26.

The preferred method of making the tree protector 10 of the present invention involves injection molding of plastic material to form the tree protector 10 in a rigid mold. It is noted that injection molding allows the use of a wider range of materials, particularly various polyethylene materials which are preferred to provide greater strength for resistance to relatively higher force impacts. Although the present tree protector could be made in a series of connectable parts, the preferred embodiment is an integral molded plastic manufacture.

Alternatively, the tree protector could be extruded in plurality sections, each section having a connector so that the various components can be connected to form a corrugated band. The advantage of this method of production would be that the density could be slightly greater for shipping and a single die could be used to fabricate tree protectors having a variety of diameter.

EXAMPLE 1

Test results are provided below for one example of tree protectors, having the following parameters:

| Height, in: | 4.0 |
|---|---|
| Outside Diameter, in: | 5.5 |
| Inside Diameter, in: | 4.0 |
| Wall Thickness, in: | 0.06 |
| Weight, g: | 90 |
| Color: | Tan |

| SUMMARY OF RESULTS: | Single Rib | Double Rib |
|---|---|---|
| Maximum Load, lb: | 33.1 | 184 |
| Deflection at Maximum Load, in: | 0.18 | 0.13 |
| Deflection at Maximum Load, %: | 25 | 18 |
| Load at 50% Deflection, lb: | 30.9 | 117 |
| Blunt Impact to Produce 100% Deformation, in/lb: | 88 | n/a |
| Blunt Impact to Produce Failure, in/lb: | 143 | n/a |
| Bar Impact to Produce Failure, in/lb: | 137 | 250 |

DISCUSSION

The sample reached a "yield point" during the load deflection test. After the sample was deflected beyond this point the load dropped off as the deflection increased. The percent deflection at the yield point was recorded as well as the maximum load reached at this point.

The impact test results are given in in/lb. As a comparison a 50 lb lawn mower moving at walking speed, 3 mph, would have an impact energy of 180 in/lb. This may be deceptive because the tree protectors would not be rigidly supported in actual use and would not see a true impact as they do in the test.

TEST METHODS

Load Deflection

The load deflection test was conducted in a model 1011 Instron universal testing machine S/N 989. The specimens were supported on a flat surface. Five specimens were tested with the load distributed over 1 rib with a flat plate. Five specimens were tested with the load distributed over two ribs. A load was applied to the plate at a rate of one inch per minute. Load vs. deflection data was charted and used to determine the maximum load, the deflection at maximum load, and the load at 50% deflection.

Impact

The "blunt impact" test was conducted with a free falling weight dropped from increasing heights until a failure was observed. Specimens were placed on a flat steel base and subjected to an impact by a 5 lb weight with a 2 inch diameter face. If no failure was observed the drop height was increased and another untested rib was subjected to the impact. The test was repeated five times. The minimum impact that will produce failure was reported.

The "bar impact" was conducted in the same manner as the blunt impact using a five pound flat face weight. A ¼" bar was placed over the ribs of the test specimen then impacted with the falling weight. The test was repeated five times with the bar on one rib and five times with the bar on two ribs.

DATA

| Trial | | Load Deflection Test | | |
|---|---|---|---|---|
| | | Maximum load, lb | Deflection at Maximum Load, in | Load at 50% Deflection, lb |
| Single Rib | -1 | 37.2 | 0.214 | 31.2 |
| | -2 | 30.0 | 0.144 | 29.4 |
| | -3 | 31.0 | 0.155 | 29.6 |
| | -4 | 30.1 | 0.140 | 28.9 |
| | -5 | 37.2 | 0.266 | 35.5 |
| Average | | 33.1 | 0.176 | 30.9 |
| Double Rib | -1 | 141 | 0.126 | 108 |
| | -2 | 157 | 0.114 | 116 |
| | -3 | 172 | 0.140 | 112 |
| | -4 | 219 | 0.134 | 127 |
| | -5 | 229 | 0.122 | 124 |
| Average | | 184 | 0.127 | 117 |

| | Impact Test Impact to Produce Failure in/lb | | | |
|---|---|---|---|---|
| Trial | Bar on Single Rib | Bar on Double Rib | Blunt on Single Rib | Impact to Produce 100% Deformation in/lb |
| 1 | 100 | 300 | 125 | 75 |
| 2 | 125 | 250 | 125 | 100 |
| 3 | 160 | 250 | 90 | 90 |
| 4 | 140 | 220 | 175 | 75 |
| 5 | 160 | 230 | 200 | 100 |
| Average | 137 | 250 | 143 | 88 |

It is to be understood, however, that even though numerous characteristics and advantages of the present invention have been set forth in the foregoing description, together with details of the structure and function of the invention, the disclosure is illustrative, and changes in matters of order, shape, size and arrangement of parts may be made within the principals of the invention and to the full extent indicated by the broad general meaning of the terms in which the appended claims are expressed.

What is claimed is:

1. A semi-rigid tree protector positionable about a circumference outer surface, said tree protector comprising corrugated band means for encircling the circumference of the base of the tree, said corrugated band means including a series of alternating ridges and grooves each extending substantially vertically of the base of the tree when said band means are positioned around the base of the tree, each said groove including a vertical wall with an inside surface that is positioned adjacent to and extending generally parallel to the circumference of the tree in a circumferential direction and said band means being made of materials which are sufficiently flexible and resilient to withstand and absorb energy from impact such that the tree can be protected from injury due to the impact.

2. The tree protector of claim 1 wherein said ridges and grooves alternate at regular intervals.

3. The tree protector of claim 2 wherein said ridges and groove extend substantially the entire height of said band means.

4. The tree protector of claim 1 wherein said corrugated band means include first and second ends, and coupling means for coupling said first and second ends together around the circumferential outer surface of the base of the tree.

5. The tree protector of claim 4 wherein said coupling means includes a coupling member connected to said first end and a channel member adapted to receive and retain said coupling member, said channel member being connected to said second end.

6. The tree protector of claim 5 wherein said coupling member includes a column having a substantially circular horizontal cross-section, wherein said channel member defines a resilient opening for receiving said coupling member, and wherein said channel member is made of semi-flexible polymeric materials, and wherein said column must generally be forced through said opening and into said channel member in order to become engaged therein, whereby said resilient opening is momentarily enlarged in the process thereof.

7. The tree protector of claim 4 wherein said coupling means include knob members and slots in each of the respective ends oriented such that a first knob member in the first end is engagable in a first slot in the second end and a second knob member in the second end is engagable in a second slot in the first end, wherein the respective ends can be coupled together thereby.

8. The tree protector of claim 1 wherein said corrugated band means are made of a semi-flexible, resilient polymeric material selected from the group consisting of polyethylene and polyvinyl chloride.

9. A method of protecting a base of a tree from the impact of lawn care equipment, comprising the steps of:
(a) providing a tree protector which is positionable about a circumference of a base of a tree, the base of the tree having a circumferential outer space, said tree protector comprising corrugated band means for encircling the circumference of the base of the tree, said corrugated band means including a series of alternating ridges and grooves extending substantially vertically of the base of the tree when said band means are positioned around the base of the tree, said band means including first and second ends, and said tree protector further including coupling means for coupling said first and second ends together around the circumferential outer service of the base of the tree, said coupling means being engageable responsive to axial displacement; and
(b) encircling the circumference of the base of the tree with said corrugated band means; and
(c) coupling the first and second ends of the band means together by axially displacing said ends with respect to one another and sliding said ends in the axial direction towards alignment, thereby causing said coupling means to couple the first and second ends, wherein said tree protector protects the base of the tree from the impact of lawn care equipment which might otherwise impact against and damage the base of the tree.

10. The method of claim 9 wherein each said groove includes a vertically extending surface, each said surface having a roughly similar radius of curvature to that of the circumferential outer surface of the tree when said band means are positioned therearound, and wherein the step of encircling the circumference of the base of the tree with said band means includes roughly orienting said vertically extending surfaces with the circumferential outer surface of the base of the tree.

11. The method of claim 14 wherein said coupling means include a coupling member connected to said first end and a channel member connected to said second end and adapted to receive and retain said coupling member, wherein coupling said first and second ends together includes inserting said coupling member into said channel member, wherein said coupling member includes a column having a substantially circular horizontal cross-section, and wherein said channel member defines a resilient opening for receiving said coupling member column, wherein said channel member is made of semi-flexible materials, and wherein inserting said coupling member into said channel member includes forcing said column into said channel member via said resilient opening and momentarily enlarging said resilient opening to permit the passage of the column therethrough in the process thereof.

12. The method of claim 9 wherein said coupling means include knob members and slots in each of the respective ends oriented such that a first knob member in the first end is engageable in a first slot in the second end and a second knob member in the second end is engageable in a second slot in the first end wherein the respective ends can be coupled together thereby; said method further comprising the step of engaging said first knob member in said first slot and engaging said second knob member in said second slot, thereby coupling together the respective ends.

13. The method of claim 9 further comprising the steps of:
    (c) providing a second semi-rigid tree protector identical to the first tree protector provided in step a;
    (d) encircling the circumference of the base of the tree with the second tree protector and coupling the first and second ends of the second tree protector together; and
    (e) stacking the second tree protector on top of the first tree protector.

14. The method of claim 9 wherein said corrugated band means is made of a semi-flexible resilient polymeric material selected from the group consisting of polyethylene and polyvinyl chloride, and wherein said step of encircling the circumference of the base of the tree includes bending each of said vertically extending surfaces to roughly the same radius of curvature of the circumferential outer surface of the base of the tree.

15. The method of claim 9 wherein said band means includes first and second ends, and coupling means for coupling said first and second ends together, said coupling means including a coupling member connected to said first end and a channel member adapted to receive said coupling member, said channel member being connected to said second end, and wherein the step of wrapping the tree protector around the base of the tree is followed by the step of coupling said tree protector by coupling the coupling member with the channel member.

16. A semi-rigid tree protector positionable about a circumference of a base of a tree, the base of the tree having a circumferential outer surface, said tree protector comprising:
    (a) corrugated band means for encircling the circumference of the base of the tree, said corrugated band means having first and second opposite ends, and interior and exterior surfaces, and upper and lower edges and including a series of alternating ridges and grooves each extending longitudinal between upper and lower; and
    (b) connecting means for releasably connecting said band means first end to said band means second end, said connecting means including a first engagement member and a mating second engagement member, both engagement members being located within on ridges of the tree protector such that the connecting means are remote from the surface of the tree.

17. A tree protector according to claim 16, wherein said first engagement member is located at one said end of said band means and includes a knob member protruding from the surface of one ridge, and wherein said second engagement member is located at the other said end of said band means and includes a recess sized and shaped to receive said first engagement member therein.

18. A tree protector according to claim 17 wherein said knob member extends radially inward from said interior surface of said band means.

19. A tree protector according to claim 12, wherein said knob member extends radially outward from the exterior surface of said band means.

20. A tree protector according to claim 17, wherein said knob member and said mating recess are located proximate one said edge.

21. A semi-rigid tree protector positionable about a circumference of a base of a tree, the base of the tree having a circumferential outer surface, said tree protector comprising corrugated band means for encircling the circumference of the base of the tree, said corrugated band means including a series of alternating ridges and grooves each extending substantially vertically of the base of the tree, said ridges and grooves extending substantially the entire height of said band means, and said tree protector having an upper edge, a bottom edge, and a plurality of upright columns integrally formed on an inside surface of a plurality of said ridges, said columns extending in a direction generally perpendicular to the respective edges, wherein circumferential dimensions of the tree protector are tapered from the bottom edge to the top edge so that the columns can rest upon the upper edge of a second tree protector when stacked thereupon.

22. A semi-rigid tree protector positionable about a circumference of a base of a tree, the base of the tree having a circumferential outer surface, said tree protector comprising:
    (a) corrugated band means for encircling the circumference of the base of the tree, said corrugated band means having first and second opposite ends, and interior and exterior surfaces, and upper and lower edges and including a series of alternating ridges and grooves each extending longitudinally between upper and lower edges; and
    (b) connecting means for releasably connecting said band means first end to said band means second end, said connecting ends including a first engagement member and a second mating engagement member, one of said engagement members being located on said band means first end, and the other engagement member being located on the band means second end, and said engagement members being constructed and arranged to couple upon the axial movement of one band means end with respect to the other band means end.

23. A semi-rigid tree protector positionable about a circumference of a base of a tree, the base of the tree having a circumferential outer surface, said tree protector comprising: corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to withstand a blind impact of about 143 inch/pounds exerted upon one of said ridges without failing.

24. A semi-rigid tree protector positionable about a circumference of a base of a tree, the base of the tree having a circumferential outer surface, said tree protector comprising: corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to withstand a bar impact of about 137 inch/pounds exerted upon one of said ridges without failing.

25. A semi-rigid tree protector positionable about a circumference of a base of a tree, the base of the tree having a circumferential outer surface, said tree protector comprising: corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to withstand a bar impact of about 250 inch/pounds exerted upon two adjacent ridges without failing.

26. A semi-ridge tree protector positionable about a circumference of a base of a tree, the base of the tree having a circumferential outer surface, said tree protector comprising corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to deflect 50% of deflection at failure upon withstanding a force of between about 28.9 and 35.5 pounds exerted upon one said ridge such that the tree can be protected from injury due to the impact.

27. A semi-rigid tree protector positionable about a circumference of a base of a tree, the base of the tree having a circumferential outer surface, said tree protector comprising corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to deflect between about 0.140 and 0.266 inches upon withstanding a force of between about 30 and 37.2 pounds exerted upon one said ridge such that the tree can be protected from injury due to the impact.

28. A semi-rigid tree protector positionable about a circumference of a base of a tree, the base of the tree having a circumferential outer surface, said tree protector comprising corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to deflect 50% of deflection at failure upon withstanding a force of between about 108 and 127 pounds exerted upon portions of two adjacent said ridges such that the tree can be protected from injury due to the impact.

29. A semi-rigid tree protector positionable about a circumference of a base of a tree, the base of the tree having a circumferential outer surface, said tree protector comprising corrugated band means for encircling the circumference of the base of the tree, said corrugated band means including a series of alternating ridges and grooves each extending substantially vertically of the base of the tree when said band means are positioned around the base of the tree, said band means being made of materials which are sufficiently flexible and resilient to deflect between about 0.114 and 0.140 inches upon withstanding a force of between about 141 and 229 pounds exerted upon portions of two adjacent said ridges such that the tree can be protected from injury due to the impact.

* * * * *

UNITED STATES PATENT AND TRADEMARK OFFICE
CERTIFICATE OF CORRECTION

PATENT NO. : 5,060,416

DATED : 10/29/91

INVENTOR(S) : George A. Rohde, Jr.

It is certified that error appears in the above-identified patent and that said Letters Patent is hereby corrected as shown below:

In column 3, line 65, "mean" should read --means--;

In column 4, line 37, "dimishing" should read --diminishing--;

In column 6, line 11, "neat" should read --near--;

In column 6, line 16, delete "knobbed" and insert therefor --knob--;

In column 6, line 17, insert "of" after the word "surface";

In column 6, line 31, delete "knobbed" and insert therefor --knob--;

In column 7, line 39, "en" should read --ends of--;

In column 7, line 39, insert --together as-- after the word "coupled";

In column 8, line 2, "wall" should read --walls--;

In column 8, line 61, "50," should read --50'--;

UNITED STATES PATENT AND TRADEMARK OFFICE
CERTIFICATE OF CORRECTION

PATENT NO. : 5,060,416

DATED : 10/29/91

INVENTOR(S) : George A. Rohde, Jr.

It is certified that error appears in the above-identified patent and that said Letters Patent is hereby corrected as shown below:

In column 9, line 68, insert --of-- after the numeral "24";

In column 10, line 9, delete "an" after the word "on";

In column 10, line 9, "14b," should read --14b'--;

In column 10, line 60, delete "are then slided" and insert therefor --then slide--.

In column 10, line 66, delete "are slided" and insert therefor --slide--;

In column 12, line 37, insert --.-- after the numeral "14a''' ";

In column 12, line 41, "diameters" should read --diameter--;

In column 14, line 2, "diameter" should read --diameters--;

In column 15, line 40, "principals" should read --principles--;

In column 15, line 47 (claim 1), insert --of a base of a tree, the base of the tree having a circumferential-- after the word "circumference";

UNITED STATES PATENT AND TRADEMARK OFFICE
CERTIFICATE OF CORRECTION

PATENT NO. : 5,060,416

DATED : 10/29/91

INVENTOR(S) : George A. Rohde, Jr.

It is certified that error appears in the above-identified patent and that said Letters Patent is hereby corrected as shown below:

In column 15, lines 55 and 56 (claim 1), "circumference" should read "circumferential--

In column 15, line 64 (claim 3), "groove" should read --grooves--;

In column 16, line 43 (claim 9), "service" should read --surface--;

In column 17, line 65 (claim 16), insert --edges-- after the word "lower";

In column 18, line 29 (claim 21), insert --when said band means are positioned around the base of the tree-- after the word "tree,"

In column 19, line 31 (claim 26), "semi-ridge" should read --semi-rigid--.

Signed and Sealed this

Sixteenth Day of March, 1993

Attest:

STEPHEN G. KUNIN

*Attesting Officer*  *Acting Commissioner of Patents and Trademarks*